Nov. 17, 1936.     W. RAISCH     2,060,896
FILTER
Filed March 26, 1936
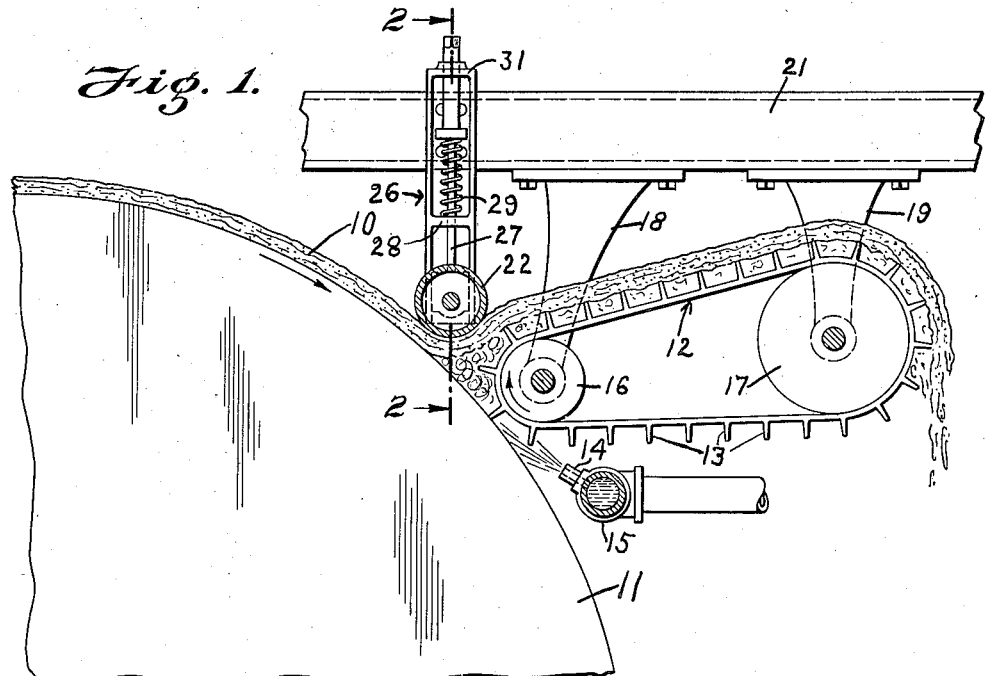
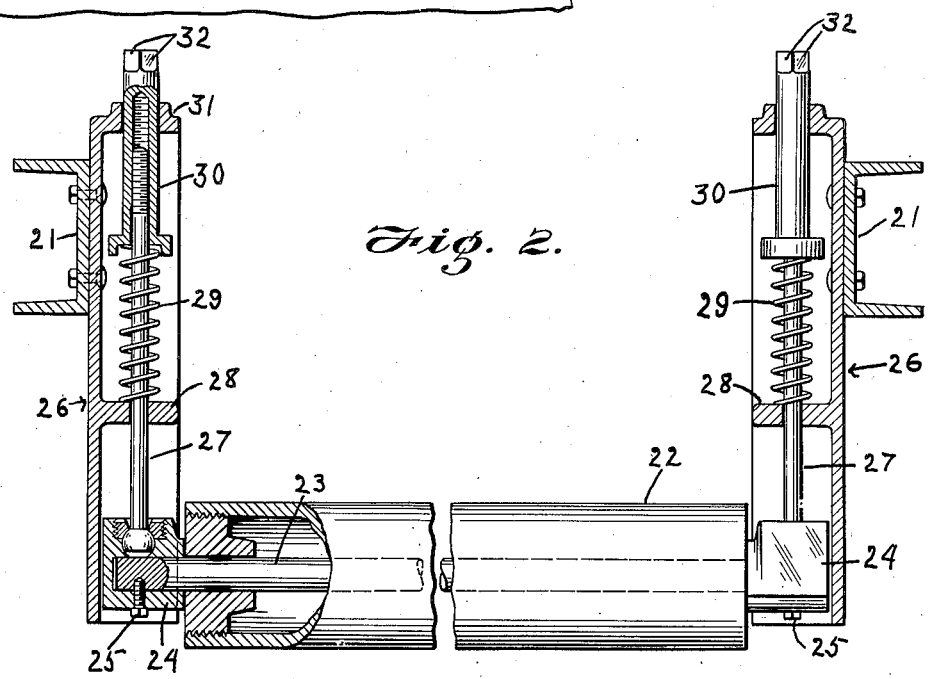
INVENTOR
William Raisch
BY
Louis L. Amart
his ATTORNEY

UNITED STATES PATENT OFFICE 2,060,896

FILTER

William Raisch, New York, N. Y., assignor to Municipal Sanitary Service Corporation, New York, N. Y., a corporation of New York Application March 26, 1936, Serial No. 70,926

6 Claims. (Cl. 210—201)

The present invention relates to filters of the rotary type and more particularly to means for stripping filter cake from the drum of a rotary filter.

The main object of the invention is to provide novel and advantageous means for assuring effective stripping of filter cake.

The improvements of the present invention are particularly adapted for use in connection with the apparatus disclosed in my Patent No. 2,027,652, granted January 14, 1936. In the patented apparatus, removal of filter cake from the downwardly moving portion of the belt was effected by use of a conveyor belt to receive stripped cake and carry it away from the filter drum, means on the conveyor belt to brush cake from the drum, and means for throwing a liquid spray up between the conveyor belt and the drum.

In using the patented apparatus, it was found that frequently difficulty was experienced in starting the stripping action. Such troubles are, however, obviated by use of the present invention which, in a preferred embodiment, provides a roller located in the opening between the conveyor belt and the drum above the path of the stripped filter cake and acting to compact the filter cake to some extent and to guide it to the conveyor belt. Preferably the roller is so constructed and supported as to exert only a slight resistance to upward pressure.

Other objects, features and advantages will appear upon consideration of the following detailed description and of the drawing in which—

Fig. 1 is a fragmentary view of a filter equipped with a preferred embodiment of the invention; and Fig. 2 is a section taken along the line 2—2 of Fig. 1.

As illustrated in the drawing, filter cake 10 is stripped from the downward moving side of a rotary drum 11 of a vacuum filter and carried away from the drum by a conveyor belt 12. The conveyor belt 12 is provided with suitable means, such as flexible flaps or ribs 13, for brushing the cake from the drum. The stripping action is also assisted by means of liquid spray from spray nozzles 14 supplied from a transverse pipe 15. The conveyor belt 12 is carried on rotary members 16 and 17 rotatably mounted in brackets 18 and 19 respectively mounted on suitable supports, such as structural beams 21. The structure thus far described is substantially the same as structure disclosed in said Patent No. 2,027,652.

According to the illustrated embodiment of the present invention, a roller 22 is rotatably mounted on a rod or shaft 23 secured in suitable bores in blocks 24 by means of set screws 25. Said blocks 24 are slidable in guideways in frames 26 secured to beams 21. Only a very light pressure of the roller 22 on the cake is desired. To this end the blocks 24 are connected by suitable means, such as ball and socket joints, to the lower ends of rods 27 passing loosely through openings in flanges or webs 28 and yieldably supported by suitable helical springs 29 on said rods and interposed between the flanges 28 and the cupped lower ends of members 30 threaded on the rods 27. As disclosed, the members 30 have round bodies passing loosely through openings in cross members 31 at the upper ends of the frames 26, and such round bodies have central bores into which the upper ends of rods 27 are screw threaded. The upper ends of the members 30 are provided with flats 32 to cooperate with a wrench so that by turning the members 30 the action of the springs 29 may be varied.

In operation the roller 22 acts to compress the cake 10 slightly as well as to smooth and even it, and then to assist in guiding it to the conveyor belt. The roller 22 is of especial advantage in starting the stripped cake to the conveyor in that the cake passes directly to the conveyor belt instead of piling up to a considerable extent, in the trough-like space between the drum 11 and the adjacent end of the conveyor belt.

Particularly when the cake is thin, there is a tendency for it to roll up between the drum and the conveyor belt and, if it were not for the roller 22, the roll thus formed would increase to a large mass before it would be carried away by the conveyor belt. A large mass would then be carried only at one time and the same action would probably be repeated, thus interfering with uniformity of operation which uniformity is important. The suspension of the roller by the helical springs 29 is such that the roller ordinarily exerts very little pressure on the accumulating cake in directing it to the conveyor belt. If, however, the accumulating cake is dense enough, the roller will be lifted higher and more of its weight rendered available to produce pressure and eventually the springs might be compressed before the accumulated mass would flow to the conveyer belt.

It will be evident that the roller 22 in guiding cake from the drum 11 to the conveyor belt 12 exerts practically no resistance to the forward movement of the cake.

It should be understood that various changes may be made and that certain features may be used without others, without departing from the true spirit and scope of the invention.

Having thus described my invention, I claim:

1. In apparatus comprising a rotary suction-filter drum, a conveyor belt to receive filter cake from the downwardly moving portion of the drum and means on the belt to brush cake from the drum, a roller above the space between the drum and conveyor belt, and means for rotatably supporting and guiding the roller so as to exert slight resistance to upward pressure of the cake and guide the cake to the conveyor belt.

2. In apparatus comprising a rotary suction-filter drum, a conveyor belt to receive filter cake from the downwardly moving portion of the drum and means on the belt to brush cake from the drum, a rotatable roller above the space between the drum and conveyor belt, and spring means for supporting the roller so that it will exert slight resistance to upward pressure by the cake.

3. In apparatus comprising a rotary suction-filter drum, a conveyor belt to receive filter cake from the downwardly moving portion of the drum and means on the belt to brush cake from the drum, a rotatable roller to engage from above cake passing from the drum to the conveyor belt and assure proper feed thereof to the conveyor belt.

4. In apparatus comprising a rotary suction-filter drum, a conveyor belt to receive filter cake from the downwardly moving portion of the drum and means on the belt to brush cake from the drum, and a device having a movable surface to engage from above and travel with cake passing from the drum to the conveyor belt.

5. In apparatus comprising a rotary suction-filter drum, a conveyor belt to receive filter cake from the downwardly moving portion of the drum and means on the belt to brush cake from the drum, a rotatable roller positioned to engage the upper surface of cake passing from the drum to the conveyor belt and guide the cake to the conveyor belt, a roller mounting whereby the position of the roller may be determined by the cake, and spring means for supporting the roller.

6. In apparatus comprising a rotary suction-filter drum, a conveyor belt to receive filter cake from the downwardly moving portion of the drum and means on the belt to brush cake from the drum, a rotatable roller positioned to engage the upper surface of cake passing from the drum to the conveyor belt and guide the cake to the conveyor belt, bearing blocks in which said rotatable roller is rotatably mounted, guide ways for said roller, and helical springs supporting said bearing blocks to produce light pressure by said roller.

WILLIAM RAISCH.